(12) United States Patent
Carter et al.

(10) Patent No.: US 11,297,823 B1
(45) Date of Patent: Apr. 12, 2022

(54) BED BUG PREVENTION BAND

(71) Applicants: James Carter, San Jose, CA (US); James Carter, Jr., San Jose, CA (US)

(72) Inventors: James Carter, San Jose, CA (US); James Carter, Jr., San Jose, CA (US)

( * ) Notice: Subject to any disclaimer, the term of this patent is extended or adjusted under 35 U.S.C. 154(b) by 208 days.

(21) Appl. No.: 16/427,456

(22) Filed: May 31, 2019

(51) Int. Cl.
*A01M 29/12* (2011.01)
*A47C 31/00* (2006.01)

(52) U.S. Cl.
CPC .......... *A01M 29/12* (2013.01); *A47C 31/007* (2013.01)

(58) Field of Classification Search
CPC ....... A47C 31/007; A01M 29/12; A01M 1/00; A01M 1/14; A01M 1/18; A01M 1/24; A01M 1/026; A01M 29/00; A01M 29/30; A01M 29/34
USPC ............. 47/32.5, 32.4, 132.1, 108, 124, 123
See application file for complete search history.

(56) References Cited

U.S. PATENT DOCUMENTS

| | | | | |
|---|---|---|---|---|
| 691,546 | A * | 1/1902 | Hubbell | A01M 1/18 43/108 |
| 1,345,690 | A * | 7/1920 | Perl | A01M 1/18 43/108 |
| 1,733,233 | A * | 10/1929 | Mork | A01M 1/18 47/32.5 |
| 1,742,064 | A * | 12/1929 | Dinstuhl | A47G 9/0238 5/498 |
| 1,780,407 | A * | 11/1930 | Smith | A01M 1/2044 239/36 |
| 2,024,050 | A * | 12/1935 | May | A47C 21/022 24/72.5 |
| 2,188,576 | A * | 1/1940 | Mulloy | A47C 21/022 5/498 |
| 2,205,711 | A * | 6/1940 | Banks | A01K 27/007 119/654 |
| 2,389,870 | A * | 11/1945 | Reevely | A01G 23/10 47/57.5 |
| 2,593,781 | A * | 4/1952 | Meis | A01M 1/18 43/108 |
| 2,911,756 | A * | 11/1959 | Geary | A01M 1/02 43/114 |
| 3,143,747 | A * | 8/1964 | McSorley | A47D 15/02 5/498 |
| 4,722,477 | A * | 2/1988 | Floyd | A01M 31/008 224/267 |
| 4,884,305 | A * | 12/1989 | Blackmon | A47C 21/022 5/496 |
| 5,155,950 | A * | 10/1992 | Burgeson | A41F 9/002 43/121 |
| 5,327,595 | A * | 7/1994 | Allen | A47C 21/022 24/72.5 |
| 5,377,391 | A * | 1/1995 | Foster | A47C 21/022 24/301 |
| 6,233,762 | B1 * | 5/2001 | Bradley | A47C 21/022 5/484 |

(Continued)

*Primary Examiner* — Darren W Ark
*Assistant Examiner* — Zoe Tam Tran
(74) *Attorney, Agent, or Firm* — Cramer Patent & Design, PLLC; Aaron R. Cramer

(57) ABSTRACT

A preventive device involves an elastic band capable of being secured about the base of a mattress or box spring. The elastic band is impregnated or coated with a composition that repels bed bugs. The elastic band also protects bedding from the infestation of bedbugs, which is much easier than eradication.

8 Claims, 4 Drawing Sheets

(56) References Cited

U.S. PATENT DOCUMENTS

| | | | |
|---|---|---|---|
| 6,998,133 B2* | 2/2006 | Simpson | A01M 1/145 |
| | | | 424/409 |
| 8,413,276 B2 | 4/2013 | Rattner et al. | |
| 8,516,633 B2 | 8/2013 | Dobin | |
| 8,739,333 B2 | 6/2014 | Boyle et al. | |
| 8,938,824 B2 | 1/2015 | Rensink et al. | |
| 9,179,783 B2 | 11/2015 | Snell et al. | |
| 9,220,254 B2* | 12/2015 | Dong | A47G 9/02 |
| 9,756,958 B2 | 9/2017 | Bell et al. | |
| 9,901,088 B2* | 2/2018 | Backmark | A01M 1/02 |
| 2009/0193585 A1* | 8/2009 | Winn | A47G 9/0292 |
| | | | 5/498 |
| 2010/0043274 A1* | 2/2010 | Battick | A01M 1/14 |
| | | | 43/114 |
| 2010/0272767 A1* | 10/2010 | Koele | A01M 1/2061 |
| | | | 424/403 |
| 2012/0291336 A1* | 11/2012 | Friend | A01M 1/14 |
| | | | 43/114 |
| 2015/0173341 A1* | 6/2015 | Perko | A01M 1/20 |
| | | | 43/131 |
| 2017/0013824 A1* | 1/2017 | Jackson | A01N 25/04 |
| 2017/0142954 A1* | 5/2017 | Rola | A01M 1/103 |
| 2018/0125051 A1* | 5/2018 | Backmark | A01M 1/2011 |
| 2020/0107535 A1* | 4/2020 | Hutter | A01M 1/14 |
| 2020/0267963 A1* | 8/2020 | Olszak | A01M 1/103 |

\* cited by examiner

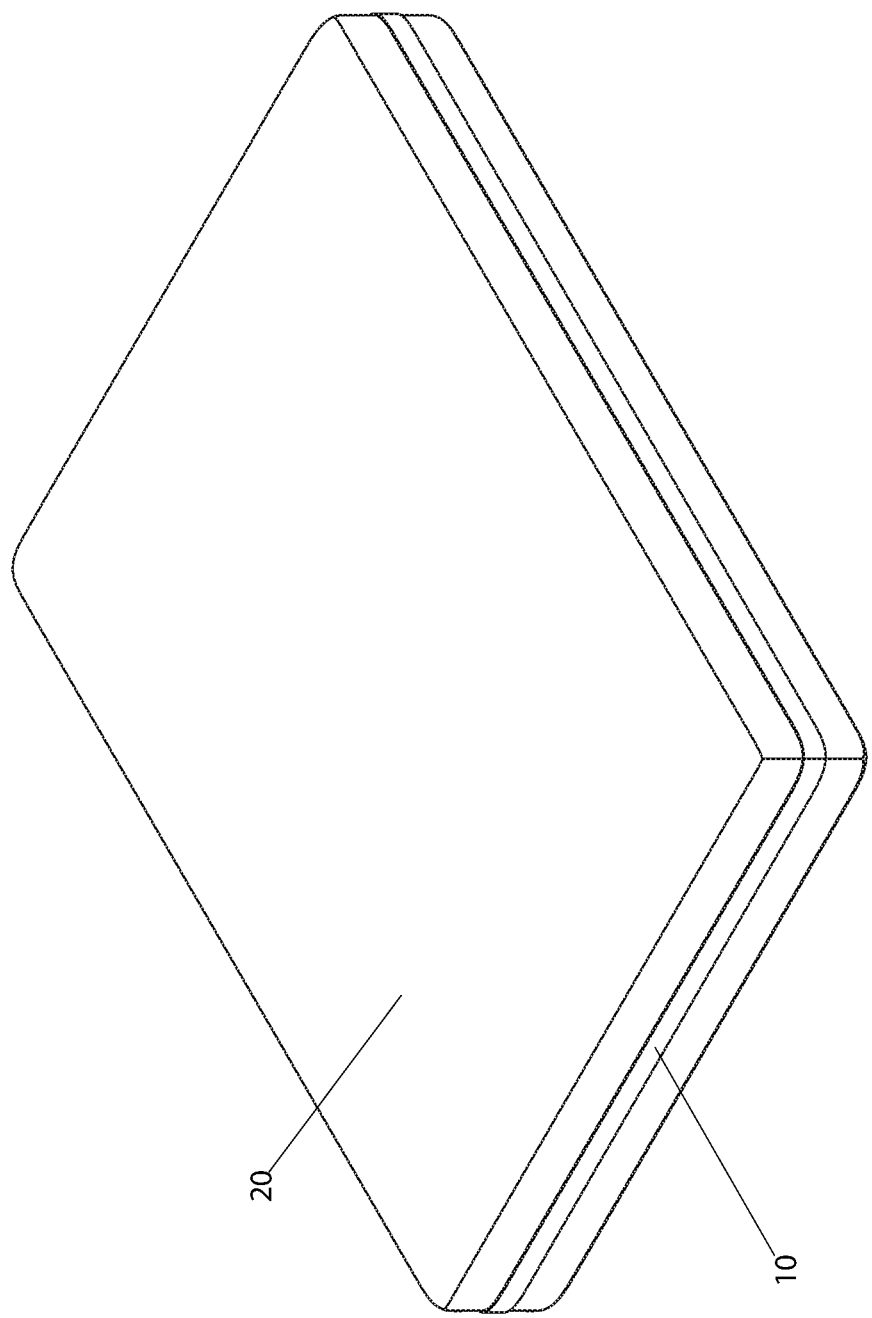

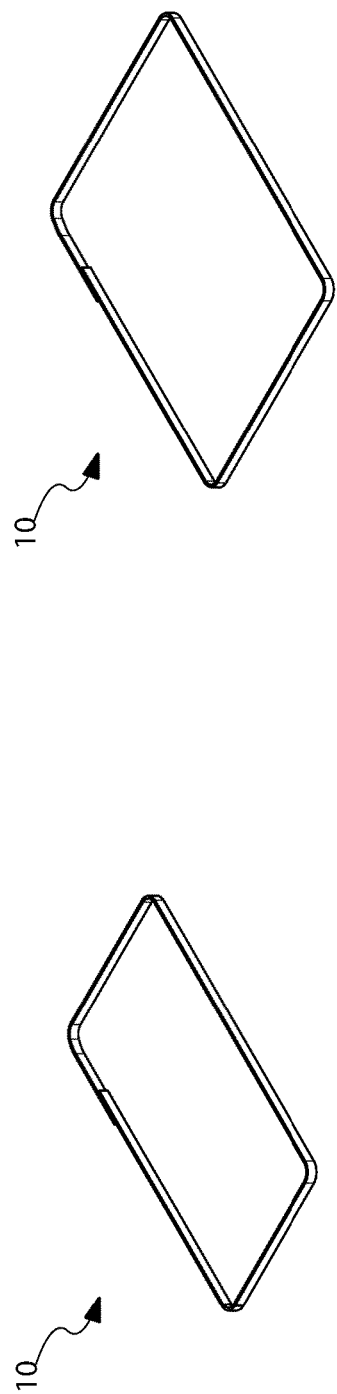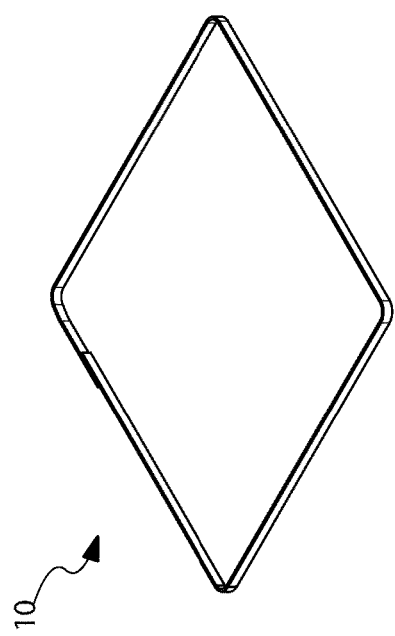

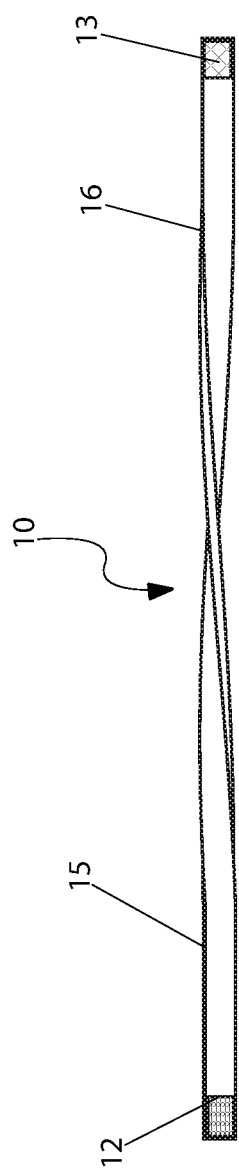

BED BUG PREVENTION BAND

RELATED APPLICATIONS

None.

FIELD OF THE INVENTION

The present invention relates generally to an insect prevention band and specifically to a bed bug prevention band.

BACKGROUND OF THE INVENTION

Recent media reports have served as a reminder to us all to be diligent regarding bed bugs. These pests are rapidly spreading across the country primarily in beds and are especially prevalent in locations such as dormitories, hotels or motels. They have also been found in dorms, hospitals, movie theaters, libraries, and other public spaces.

Cleanliness is not an accurate indicator of an infestation or not, as the bugs can thrive anywhere there are cracks and crevices to hide in making bedding a prime location to hide in. As with many infestation issues, prevention is often much easier than eradication. However, it is difficult to prevent bedding from becoming infected due to its coarse nature. Accordingly, there exists a need for a means by which bedding can be protected from the infestation of bedbugs. The development of the bed bug prevention strap fulfills this need.

SUMMARY OF THE INVENTION

The principles of the present invention provide for a bed bug prevention band, comprises an elastic elongated material, a first end of the bed bug prevention band has a first fastener which is located on a first side thereof and a second end of the bed bug prevention band has a second fastener located on a second side thereof. The first end is opposite the second end and the first side is opposite the second side. The first fastener couples to the second fastener forming the bed bug prevention band. The bed bug prevention band may provide a chemical barrier to bed bugs from residing on, travelling on, or travelling near the bed.

The bed bug prevention band may be impregnated, coated, or otherwise associated with an integral composition. The integral composition may provide a chemical barrier to the bed bugs from residing on, travelling on, or travelling near a bed.

The elastic elongated material may be one inch in height and/or one-eighth of an inch in thickness. The first fastener may be removable type of fastener. The first fastener may also be a hook-and-loop-type of fastener. A portion adjacent to the first fastener may be elastic. The second fastener may also be a removable type of fastener. The second fastener may be a hook-and-loop-type of fastener. A portion adjacent to the second fastener may be elastic.

The bed bug prevention band may be removably attachable to a mattress. The bed bug prevention band may also be removably attachable to a box spring. The bed bug prevention band may be twisted.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is an environmental perspective view of the bed bug prevention band 10 as attached to a mattress 20, according to the preferred embodiment of the present invention;

FIG. 2a is a perspective view of the bed bug prevention band 10, according to an alternate embodiment of the present invention;

FIG. 2b is a perspective view of the bed bug prevention band 10, according to another alternate embodiment of the present invention;

FIG. 2c is a perspective view of the bed bug prevention band 10, according to yet another alternate embodiment of the present invention;

Figure 3:
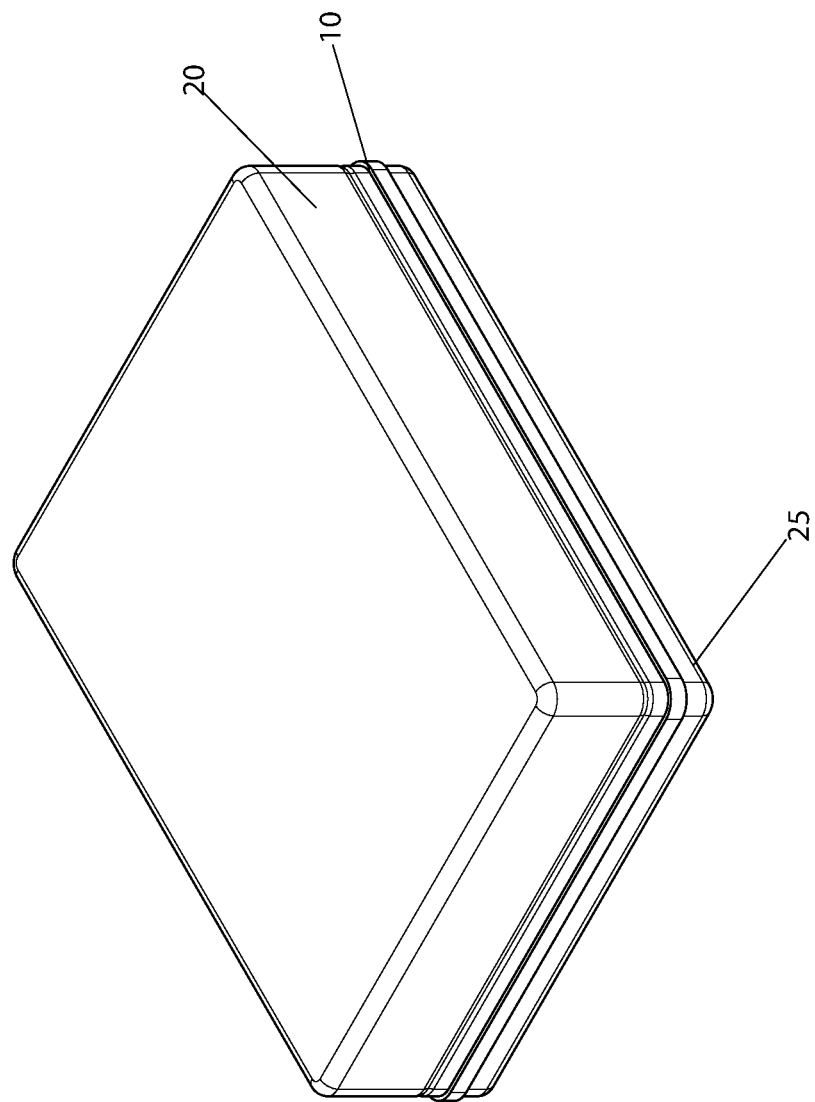
FIG. 3 is a perspective view of the bed bug prevention band 10, as attached to a box spring 25 according to the preferred alternate embodiment of the present invention; and, FIG. 4 is a plan view of the bed bug prevention band 10, according to a preferred embodiment of the present invention.

DESCRIPTIVE KEY 10 bed bug prevention band
12 first fastener
13 second fastener
15 first end
16 second end
20 mattress
25 box spring

DESCRIPTION OF THE PREFERRED EMBODIMENTS

The best mode for carrying out the invention is presented in terms of its preferred and alternate embodiments, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring to FIGS. 1 and 4, there is disclosed a bed bug prevention band (herein described as a "band") 10, that is removably attachable to a mattress 20. More specifically, as illustrated in FIG. 1, the band 10 is removably attached to a middle portion of the sides of the mattress 20. The band 10 is impregnated, coated, or otherwise associated with an integral composition. The use of the band 10 provides a chemical barrier to bed bugs (*Cimex lectularius, Cimex hemipterus*) from residing on, travelling on, or travelling near the bed. It is appreciated that other similar insects or pests can be prevented from entering the general area that the band 10 resides.

The band 10 comprises an elastic elongated material that is preferably approximately one inch (1 in.) in height and one-eighth of an inch (⅛ in.) in thickness. A first end 15 of the band 10 has a first fastener 12 located on a first side thereof. A second end 16 of the band 10 has a second fastener 13 located on a second side thereof. The first end 15 is opposite the second end 16 and the first side is opposite the second side (please see FIG. 4). The band 10 is elastic and flexible enough to form a continuous member when the first fastener 12 of the first end 15 is removably fastened to the second fastener 16 of the second end 13. The fasteners are preferably a removable type of fastener, such as hook-and-loop-type of fasteners (e.g. Velcro™), although other fasteners can be envisioned. It is also appreciated that the elasticity of the band 10 is coterminous with the entirety of the band 10 itself. Other embodiments may provide for a portion of the band 10 to be elastic, such as the portions including and immediately adjacent to the first end 15 and second end 16 to facilitate fastening of the fasteners 12, 13 together.

In the embodiment depicted in FIG. 1, the length of the band 10 is such that it is capable of snug attachment about a queen-sized mattress 20. Such a size would be equivalent to sixty by eighty inches (60×80 in.). Other similarly sized mattresses 20, such as an Olympic queen size equivalent to sixty-six by eighty inches (66×80 in.) are appreciated as falling under the overall scope of the invention.

In the embodiment depicted in FIG. 2a, the length of the band 10 is such that it is capable of snug attachment about a twin-sized mattress 20. Such a size would be equivalent to thirty-eight by seventy-five inches (38×75 in.). Other similarly sized mattresses 20, such as an extra-large twin size, equivalent to thirty-eight by eighty inches (38 5×80 in.) and a small single, equivalent to thirty by seventy inches (30×70 in.) are appreciated as falling under the overall scope of the invention.

In the embodiment depicted in FIG. 2b, the length of the band 10 is such that it is capable of snug attachment about a full-sized mattress 20. Such a size would be equivalent to fifty-four by seventy-five inches (54×75 in.). Other similarly sized mattresses 20, such as an extra-large full size, equivalent to fifty-four by eighty inches (54×80 in.) are appreciated as falling under the overall scope of the invention.

In the embodiment depicted in FIG. 2c, the length of the band 10 is such that it is capable of snug attachment about a king-sized mattress 20. Such a size would be equivalent to seventy-six by eighty inches (76×80 in.). Other similarly sized mattresses 20, such as a California king size equivalent to seventy-two by eighty-four inches (72×84 in.) are appreciated as falling under the overall scope of the invention.

FIG. 3 depicts an alternate method of use, where the band 10 is removably secure about a box spring 25. More specifically, as illustrated in FIG. 3, the band 10 is removably attached to a middle portion of the sides of the box spring 25. The box spring 25 is typically used to support the mattress 20 in a bed assembly. As such, the sizes of the band 10 mentioned above can also be used to removably secure about the box spring 25 of similar size.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A bed bug prevention band, consisting of:
   an elastic elongated material;
   a first end of said bed bug prevention band having a first fastener located on a first side thereof; and
   a second end of said bed bug prevention band having a second fastener located on a second side thereof, said first end is opposite said second end and said first side is opposite said second side, said first fastener couples to said second fastener forming said bed bug prevention band;
   wherein said bed bug prevention band is adapted to be removably attached to a middle portion of a plurality of sides of the mattress;
   wherein said bed bug prevention band is a chemical barrier to bed bugs from residing on, travelling on, or travelling near said bed;
   wherein said bed bug prevention band is impregnated, coated, or otherwise associated with an integral composition;
   wherein said integral composition provides said chemical barrier to said bed bugs from residing on, travelling on, or travelling near a bed;
   wherein said bed bug prevention band is adapted to be removably attached to a middle portion of a plurality of sides of a box spring;
   wherein said bed bug prevention band is twisted once about a longitudinal axis of the bed bug prevention band defined between the first and second ends of the bed bug prevention band; and
   wherein said elastic elongated material is one inch in height.

2. The bed bug prevention band according to claim 1, wherein said elastic elongated material is one-eighth of an inch in thickness.

3. The bed bug prevention band according to claim 1, wherein said first fastener is a removable type of fastener.

4. The bed bug prevention band according to claim 3, wherein said first fastener is a hook-and-loop-type of fasteners.

5. The bed bug prevention band according to claim 1, wherein a portion adjacent to said first fastener is elastic.

6. The bed bug prevention band according to claim 1, wherein said second fastener is a removable type of fastener.

7. The bed bug prevention band according to claim 6, wherein said second fastener is a hook-and-loop-type of fasteners.

8. The bed bug prevention band according to claim 1, wherein a portion adjacent to said second fastener is elastic.

* * * * *